(12) United States Patent
Wu et al.

(10) Patent No.: US 9,697,846 B2
(45) Date of Patent: Jul. 4, 2017

(54) METHOD AND APPARATUS FOR REDUCING ECHO

(71) Applicant: Spreadtrum Communications (Shanghai) Co., Ltd., Zhangjiang, Shanghai (CN)

(72) Inventors: Sheng Wu, Shanghai (CN); Bin Jiang, Shanghai (CN); Fuhuei Lin, Shanghai (CN); Jingming Xu, Shanghai (CN); Ye Yuan, Shanghai (CN); Yaqin Yong, Shanghai (CN); Wei Ji, Shanghai (CN)

(73) Assignee: SPREADTRUM COMMUNICATIONS (SHANGHAI) CO., LTD., Zhangjiang, Shanghai (CN)

( * ) Notice: Subject to any disclaimer, the term of this patent is extended or adjusted under 35 U.S.C. 154(b) by 0 days.

(21) Appl. No.: 14/969,448

(22) Filed: Dec. 15, 2015

(65) Prior Publication Data

US 2016/0189727 A1 Jun. 30, 2016

(30) Foreign Application Priority Data

Dec. 30, 2014 (CN) .......................... 2014 1 0857171

(51) Int. Cl.
| | | |
|---|---|---|
| *G10L 21/02* | (2013.01) | |
| *H04B 3/20* | (2006.01) | |
| *H04R 3/00* | (2006.01) | |
| *G10L 21/0208* | (2013.01) | |
| *H04B 3/23* | (2006.01) | |

(Continued)

(52) U.S. Cl.
CPC ............ *G10L 21/0208* (2013.01); *H04B 3/23* (2013.01); *H04M 9/082* (2013.01); *H04R 3/02* (2013.01); *G10L 2021/02082* (2013.01)

(58) Field of Classification Search
CPC .. H04B 3/02; H04B 3/23; H04B 3/237; G10L 21/0208; G10L 21/02082; G10L 21/02; G10L 2021/02082; H04M 9/082; G10K 2210/108; G10K 2210/505; H04R 3/00; H04R 3/02; H04R 2410/05
See application file for complete search history.

(56) References Cited

U.S. PATENT DOCUMENTS

2004/0174991 A1* 9/2004 Hirai ........................ H04R 3/02
379/406.08
2005/0220292 A1* 10/2005 Okumura .............. H04M 9/082
379/406.12

(Continued)

*Primary Examiner* — Thang Tran
(74) *Attorney, Agent, or Firm* — Cantor Colburn LLP (57) ABSTRACT

The embodiments of the present disclosure provide a method and an apparatus for reducing an echo, which apply a first stage adaptive filter to a downlink reference signal to obtain a first stage filtered signal and a first error signal; after performing a K-path gain process and a K-path pre-distortion process to the downlink reference signal, apply the at least one second stage adaptive filter to a K-path pre-distorted signal to obtain a second stage filtered signal and a second error signal; and perform a minimum value fusion process to the first error signal and the second error signal so as to obtain a residue signal, which is considered as a final output of adaptive echo cancellation. Accordingly, the present disclosure realizes steadily providing a relatively high echo loss under a circumstance that a speaker suffers a relatively great distortion.

22 Claims, 5 Drawing Sheets

(51) Int. Cl.
*H04M 9/08* (2006.01)
*H04R 3/02* (2006.01)

(56) References Cited

U.S. PATENT DOCUMENTS

| | | | | |
|---|---|---|---|---|
| 2006/0013383 A1* | 1/2006 | Barron | H04M 9/082 | 379/406.01 |
| 2007/0121928 A1* | 5/2007 | Beaucoup | H04M 9/082 | 379/406.08 |
| 2008/0101622 A1* | 5/2008 | Sugiyama | H04M 9/082 | 381/66 |
| 2010/0184488 A1* | 7/2010 | Takada | H04R 3/00 | 455/570 |
| 2010/0223311 A1* | 9/2010 | Sugiyama | H04M 9/082 | 708/322 |
| 2011/0124380 A1* | 5/2011 | Wang | H04M 9/082 | 455/570 |
| 2012/0250852 A1* | 10/2012 | Rowley | H04M 9/082 | 379/406.01 |
| 2013/0188759 A1* | 7/2013 | Jain | H04L 27/2649 | 375/343 |
| 2015/0187348 A1* | 7/2015 | Kang | G10L 21/0208 | 381/66 |

* cited by examiner

METHOD AND APPARATUS FOR REDUCING ECHO

CROSS-REFERENCE TO RELATED APPLICATIONS

The present application claims priority to Chinese patent application No. 201410857171.6, filed on Dec. 30, 2014, and entitled "METHOD AND APPARATUS FOR REDUCING ECHO", the entire disclosure of which is incorporated herein by reference.

TECHNICAL FIELD

The present disclosure generally relates to echo technology, and more particularly, to a method and an apparatus for reducing an echo.

BACKGROUND

In audio systems, due to existence of signal reflecting paths, interference of echoes is inevitable. Echoes in audio communications include electrical echoes and acoustic echoes, where electrical echoes are caused by signal energy reflection generated by impedance mismatch and acoustic echoes refer to voices from a speaker at a listening side are collected by a microphone and transmitted back to a speaking side, where acoustic echoes include direct acoustic echoes and indirect acoustic echoes. Direct acoustic echoes are voices from a speaker directly collected by a microphone, and indirect acoustic echoes are voices from a speaker collected by a microphone, where the voices pass different paths (e.g. a house or any objects in a house) and are reflected one or more times before being collected by the microphone. Echoes suffering channel latency are transmitted back to the speaking end and heard by a teller, so that causing interference on audios at the speaking end, which reduces clarity of the audios and affects quality of audio communications.

Figure 1:
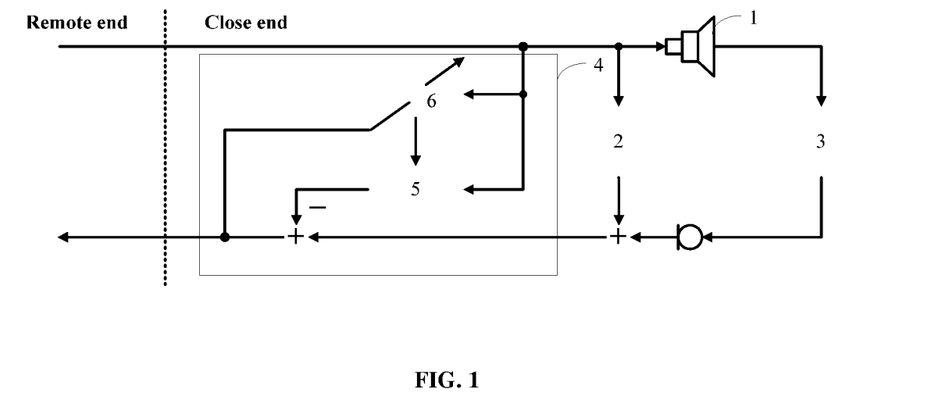
FIG. 1 schematically illustrates a block diagram presenting an conventional adaptive echo cancellation system.

In order to cancel impacts on audio communications by echoes, in 1960s, Sondhi from the Bell Laboratory firstly presented that applying adaptive filters to realize cancellation of echoes. Referring to FIG. 1, a block diagram presenting a conventional system for adaptive echo cancellation is provided. Before a speaker 1 at a close end presents a downlink reference signal that is from a remote end, the downlink reference signal passes through an electrical echo path 2 and form an electrical echo; after the speaker 1 at the close end presents the downlink reference signal, the downlink reference signal is received by a microphone via an acoustic echo path 3 and form an acoustic echo. An adaptive filter 4 performs filtering to the downlink reference signal using an echo path model 5, and use a filtered output (namely, a cancellation signal) to cancel out the acoustic echo so that obtaining a residue signal (namely, an error signal), which is transmitted to the remote end. Simultaneously, an adaptive filtering algorithm 6 inside the adaptive filter 4 modifies parameters of the echo path model 5 based on the downlink reference signal and the error signal, so as to attenuate the remaining acoustic echo gradually.

In echo cancellation technologies, since an acoustic echo possesses characteristics that multi-path, long latency, slow attenuation, time-varying, non-linearity, etc., the adaptive filter 4 with good performance for Acoustic Echo Cancellation (AEC) is needed; especially, for hand-held devices with relatively severe non-linearity, the adaptive filter 4 with even better performance is required. Due to miniaturization of hand-held devices, comparing to regular speakers, micro speakers of the hand-held devices is much smaller in size. In order to achieve a required voice volume of hands-free communications, the micro speakers frequently operate in a non-linear domain, so that distortion becomes even more severe. Under this circumstance, the adaptive filter 4 provides a very unstable echo with very small loss, and the echo generally has no loss while facing a jump signal. Accordingly, providing a method and an apparatus for reducing an echo is required, which steadily provide a relatively high echo loss under a circumstance that a speaker suffers a relatively great distortion.

SUMMARY

Regarding to the problem addressed in the background, embodiments of the present disclosure provide a method and an apparatus for reducing an echo, which steadily provide a relatively high echo loss under a circumstance that a speaker suffers a relatively great distortion.

A method for reducing an echo, including:

invoking a first stage adaptive filter corresponding to a downlink reference signal x(t), and performing a first filtering process to the downlink reference signal x(t) so as to obtain a first stage filtered signal $y_0(t)$;

subtracting a target signal by the first stage filtered signal $y_0(t)$ so as to obtain a first error signal $e_0(t)$;

performing a K-path gain process to the downlink reference signal x(t) so as to obtain a K-path pre-processed signal, where K is a positive integer;

performing a pre-distortion process to the K-path pre-processed signal so as to obtain a corresponding K-path pre-distorted signal $r_k(t)$ (k=1, 2, ..., K);

invoking at least one second stage adaptive filter corresponding to the K-path pre-distorted signal, and performing a second filtering process to the K-path pre-distorted signal so as to obtain a corresponding K-path second stage filtered signal $y_k(t)$;

subtracting the first error signal $e_0(t)$ by the K-path second stage filtered signal $y_k(t)$ so as to obtain a second error signal $e_k(t)$, where k=1, 2, ..., K;

performing a minimum value fusion process to the first error signal $e_0(t)$ and the second error signal $e_k(t)$ so as to obtain a residue signal e(t); and considering the residue signal e(t) as a final output of adaptive echo cancellation.

In some embodiments, if the echo path model in the first stage adaptive filter corresponding to the downlink reference signal x(t) is a time domain model $h_{0,t}$, the first error signal $e_0(t)$ is expressed as:

$$e_0(t) = d(t) - y_0(t),$$

$$y_0(t) = h_{0,t} \otimes x(t) = \sum_{m=1}^{M} h_{0,t}(m)x(t - M + m),$$

where d(t) is a target signal, $y_0(t)$ is the first stage filtered signal, $h_{0,t}$ is a M-order FIR filter at time t, $h_{0,t}=[h_{0,t}(1), h_{0,t}(2), \ldots, h_{0,t}(M)]^T$, a superscript T denotes transpose, $\otimes$ denotes convolution, x(t) is the downlink reference signal, t is a time index and M is a number of order.

In some embodiments, if the echo path model is a time domain model $h_{0,t}$, the echo path model $h_{0,t+1}$ of the first stage adaptive filter corresponding to the downlink reference signal x(t) is updated as:

$$h_{0,t-1}=h_{0,t}+\Delta h_{0,t},$$

where $\Delta h_{0,t}$ that is a M-order vector with M a positive integer, is a term for updating a parameter of the first stage adaptive filter in time domain.

In some embodiments, if the echo path model in the first stage adaptive filter corresponding to the downlink reference signal x(t) is a frequency domain model $H_{0,t}$, the first error signal $e_0(t)$ is expressed as:

$$e_0(t)=d(t)-y_0(t),$$

$$[y_0(t-(N-M)+1), y_0(t-(N-M)+2), \ldots, y_0(t)]^T = [0_{(N-M)\times M} I_{(N-M)\times(N-M)}]F^-[H_{0,t} R_{0,t}],$$

where d(t) is the target signal, $y_0(t)$ is the first stage filtered signal, t is the time index, N is length of a signal frame, M is the number of order, $0_{(N-M)\times M}$ is a (N−M) by M zero matrix, $I_{(N-M)\times(N-M)}$ is a (N−M) by (N−M) identity matrix, $F^-$ is an inverse discrete Fourier transform matrix, denotes a N-order vector at the time t, and $R_{0,t}=F[x(t-N+1), x(t-N+2), \ldots, x(t)]^T$.

In some embodiments, if the echo path model is a frequency domain model $H_{0,t}$, the echo path model $H_{0,t+1}$ of the first stage adaptive filter corresponding to the downlink reference signal x(t) is updated as:

$$H_{0,t+1}=H_{0,t}+\Delta H_{0,t},$$

where $\Delta H_{0,t}$ that is a N-order vector with N a positive integer, is a term for updating a parameter of the first stage adaptive filter in frequency domain.

In some embodiments the pre-distortion mapping function employed by the pre-distortion process is expressed as:

$$r_k(t)=f_k(p_k(t)),$$

where $r_k(t)$ is the k-th pre-distorted signal, $p_k(t)$ is the k-th pre-processed signal, $f_k(x)\neq cx$, $f_k(x)\neq c$, c is a constant, and k=1, 2, ..., K.

In some embodiments, if an echo path model in the at least one second stage adaptive filter corresponding to the K-path pre-distorted signal is a time domain model $h_{k,t}$, the second error signal is expressed as:

$$e_k(t) = e_0(t) - y_k(t),$$

$$y_k(t) = h_{k,t} \otimes r_k(t) = \sum_{m=1}^{M} h_{k,t}(m) r_k(t - M + m),$$

where $h_{k,t}$ is a k-th M-order FIR filter at a time t, k=1, 2, ..., K, $h_{k,t}=[h_{k,t}(1), h_{k,t}(2), \ldots, h_{k,t}(M)]^T$, the superscript T denotes transpose, $\otimes$ denotes convolution, t is the time index and M is the number of order.

In some embodiments, if the echo path model is a time domain model $h_{k,t}$, the echo path model $h_{k,t+1}$ of the at least one second stage adaptive filter corresponding to the K-path pre-distorted signal is updated as:

$$h_{k,t+1}=h_{k,t}+\Delta h_{k,t},$$

where $\Delta h_{k,t}$ with k=1, 2, ..., K that is a M-order vector with M a positive integer, is the term for updating the parameter of the at least one second stage adaptive filter in time domain.

In some embodiments, if the echo path model in the at least one second stage adaptive filter corresponding to the K-path pre-distorted signal is a frequency domain model $H_{k,t}$, the second error signal $e_k(t)$ is expressed as:

$$e_k(t)=e_0(t)-y_k(t)$$

$$[y_k(t-(N-M)+1), y_k(t-(N-M)+2), \ldots, y_k(t)]^T = [0_{(N-M)\times M} I_{(N-M)\times(N-M)}]F^-[H_{k,t} R_{k,t}],$$

where $y_k(t)$ is the second stage filtered signal, t is the time index, N is length of a signal frame, M is the number of order, $0_{(N-M)\times M}$ is the (N−M) by M zero matrix, $I_{(N-M)\times(N-M)}$ is the (N−M) by (N−M) identity matrix, $F^-$ is the inverse discrete Fourier transform matrix, $H_{k,t}$ denotes a k-th N-order vector at the time t, $R_{k,t}=F[r_k(t-N+1), r_k(t-N+2), \ldots, r_k(t)]^T$, k=1, 2, ..., K.

In some embodiments, if the echo path model is a frequency domain model $H_{k,t}$, the echo path model $H_{k,t+1}$ of the at least one second stage adaptive filter corresponding to the K-path pre-distorted signal is updated as:

$$H_{k,t+1}=H_{k,t}+\Delta H_{k,t},$$

where $\Delta H_{k,t}$ that is a N-order vector with N a positive integer, is a term for updating a parameter of the at least one second stage adaptive filter in frequency domain.

In some embodiments, performing a minimum value fusion process to a first error signal $e_0(t)$ and a second error signal $e_k(t)$ (k=1, 2, ..., K) so as to obtain a residue signal, including:

mapping the first error signal $e_0(t)$ and the second error signal $e_k(t)$ (k=1, 2, ..., K) to corresponding mapping signals respectively using an invertible space mapping method;

computing metrics corresponding to the mapping signals using a preset minimum metric function;

searching for a minimum metric from the metrics; and mapping a mapping signal corresponding to the minimum metric back to a space in which the first error signal $e_0(t)$ and the second error signal $e_k(t)$ reside, so as to obtain the residue signal e(t).

An apparatus for reducing an echo, including:

a first stage filtering unit, adapted for invoking a first stage adaptive filter corresponding to a downlink reference signal x(t), and performing a first filtering process to the downlink reference signal x(t) so as to obtain a first stage filtered signal $y_0(t)$;

a first subtracting unit, adapted for subtracting a target signal by the first stage filtered signal $y_0(t)$ so as to obtain a first error signal $e_0(t)$;

a gain unit, adapted for performing a K-path gain process to the downlink reference signal x(t) so as to obtain a K-path pre-processed signal, where K is a positive integer;

a pre-distortion processing unit, adapted for performing a pre-distortion process to the K-path pre-processed signal so as to obtain a corresponding K-path pre-distorted signal $r_k(t)$ (k=1, 2, ..., K);

a second stage filtering unit, adapted for invoking at least one second stage adaptive filter corresponding to the K-path pre-distorted signal, and performing a second filtering process to the K-path pre-distorted signal so as to obtain a corresponding K-path second stage filtered signal $y_k(t)$;

a second subtracting unit, adapted for subtracting the first error signal $e_0(t)$ by the K-path second stage filtered signal $y_k(t)$ so as to obtain a second error signal $e_k(t)$, where k=1, 2, ..., K;

a fusion processing unit, adapted for performing a minimum value fusion process to the first error signal $e_0(t)$ and the second error signal $e_k(t)$ so as to obtain a residue signal e(t); and an output unit, adapted for considering the residue signal e(t) as a final output of adaptive echo cancellation.

In some embodiments, if the echo path model in the first stage adaptive filter corresponding to the downlink reference signal x(t) is a time domain model $h_{0,t}$, the first error signal $e_0(t)$ is expressed as:

$$e_0(t) = d(t) - y_0(t),$$

$$y_0(t) = h_{0,t} \otimes x(t) = \sum_{m=1}^{M} h_{0,t}(m)x(t - M + m),$$

where d(t) is a target signal, $y_0(t)$ is the first stage filtered signal, $h_{0,t}$ is a M-order FIR filter at time t, $h_{0,t}=[h_{0,t}(1), h_{0,t}(2), \ldots, h_{0,t}(M)]^T$, a superscript T denotes transpose, $\otimes$ denotes convolution, x(t) is the downlink reference signal, t is a time index and M is a number of order.

In some embodiments, if the echo path model is a time domain model $h_{0,t}$, the echo path model $h_{0,t+1}$ of the first stage adaptive filter corresponding to the downlink reference signal x(t) is updated as:

$$h_{0,t+1}=h_{0,t}+\Delta h_{0,t},$$

where $\Delta h_{0,t}$ that is a M-order vector with M a positive integer, is a term for updating a parameter of the first stage adaptive filter in time domain.

In some embodiments, if the echo path model in the first stage adaptive filter corresponding to the downlink reference signal x(t) is a frequency domain model $H_{0,t}$, the first error signal $e_0(t)$ is expressed as:

$$e_0(t)=d(t)-y_0(t),$$

$$[y_0(t-(N-M)+1), y_0(t-(N-M)+2), \ldots, y_0(t)]^T = [0_{(N-M)\times M} I_{(N-M)\times(N-M)}]F^-[H_{0,t}R_{0,t}],$$

where d(t) is the target signal, $y_0(t)$ is the first stage filtered signal, t is the time index, N is length of a signal frame, M is the number of order, $0_{(N-M)\times M}$ is a (N–M) by M zero matrix, $I_{(N-M)\times(N-M)}$ is a (N–M) by (N–M) identity matrix, $F^-$ is an inverse discrete Fourier transform matrix, $H_{0,t}$ denotes a N-order vector at the time t, and $R_{0,t}=F[x(t-N+1), x(t-N+2), \ldots, x(t)]^T$.

In some embodiments, if the echo path model is a frequency domain model $H_{0,t}$, the echo path model $H_{0,t+1}$ of the first stage adaptive filter corresponding to the downlink reference signal x(t) is updated as:

$$H_{0,t+1}=H_{0,t}+\Delta H_{0,t},$$

where $\Delta H_{0,t}$ that is a N-order vector with N a positive integer, is a term for updating a parameter of the first stage adaptive filter in frequency domain.

In some embodiments, the pre-distortion mapping function employed by the pre-distortion process is expressed as:

$$r_k(t)=f_k(p_k(t)),$$

where $r_k(t)$ is the k-th pre-distorted signal, $p_k(t)$ is the k-th pre-processed signal, $f_k(x) \neq cx$, $f_k(x) \neq c$, c is a constant, and k=1, 2, ..., K.

In some embodiments, if an echo path model in the at least one second stage adaptive filter corresponding to the K-path pre-distorted signal is a time domain model $h_{k,t}$, the second error signal is expressed as:

$$e_k(t) = e_0(t) - y_k(t),$$

$$y_k(t) = h_{k,t} \otimes r_k(t) = \sum_{m=1}^{M} h_{k,t}(m)r_k(t - M + m),$$

where is a k-th M-order FIR filter at a time t, k=1, 2, ..., K, $h_{k,t}=[h_{k,t}(1), h_{k,t}(2), \ldots, h_{k,t}(M)]^T$, the superscript T denotes transpose, $\otimes$ denotes convolution, t is the time index and M is the number of order.

In some embodiments, if the echo path model is a time domain model $h_{k,t}$, the echo path model $h_{k,t+1}$ of the at least one second stage adaptive filter corresponding to the K-path pre-distorted signal is updated as:

$$h_{k,t+1}=h_{k,t}+\Delta h_{k,t},$$

where $\Delta h_{k,t}$ with k=1, 2, ..., K that is a M-order vector with M a positive integer, is the term for updating the parameter of the at least one second stage adaptive filter in time domain.

In some embodiments, if the echo path model in the at least one second stage adaptive filter corresponding to the K-path pre-distorted signal is a frequency domain model $H_{k,t}$, the second error signal $e_k(t)$ is expressed as:

$$e_k(t)=e_0(t)-y_k(t),$$

$$[y_k(t-(N-M)+1), y_k(t-(N-M)+2), \ldots, y_k(t)]^T = [0_{(N-M)\times M} I_{(N-M)\times(N-M)}]F^-[H_{k,t}R_{k,t}],$$

where $y_k(t)$ is the second stage filtered signal, t is the time index, N is length of a signal frame, M is the number of order, $0_{(N-M)\times M}$ is the (N–M) by M zero matrix, $I_{(N-M)\times(N-M)}$ is the (N–M) by (N–M) identity matrix, $F^-$ is the inverse discrete Fourier transform matrix, $H_{k,t}$ denotes a k-th N-order vector at the time t, $R_{k,t}=F[r_k(t-N+1), r_k(-N+2), \ldots, r_k(t)]^T$, k=1, 2, ..., K.

In some embodiments, if the echo path model is a frequency domain model $H_{k,t}$, the echo path model $H_{k,t+1}$ of the at least one second stage adaptive filter corresponding to the K-path pre-distorted signal is updated as:

$$H_{k,t+1}=H_{k,t}+\Delta H_{k,t},$$

where $\Delta H_{k,t}$ that is a N-order vector with N a positive integer, is a term for updating a parameter of the at least one second stage adaptive filter in frequency domain.

In some embodiments, the fusion processing unit may include:

a mapping sub-unit, adapted for mapping the first error signal $e_0(t)$ and the second error signal $e_k(t)$ (k=1, 2, ..., K) to corresponding mapping signals respectively using an invertible space mapping method;

a metric computing sub-unit, adapted for computing metrics corresponding to the mapping signals using a preset minimum metric function;

a searching sub-unit, adapted for searching for a minimum metric from the metrics; and a residue signal obtaining sub-unit, adapted for mapping a mapping signal corresponding to the minimum metric back to a space in which the first error signal $e_0(t)$ and the second error signal $e_k(t)$ reside, so as to obtain the residue signal e(t).

From above, the embodiments of the present disclosure provide a method and an apparatus, which employ the first stage adaptive filter corresponding to the downlink reference signal to perform a first stage echo cancellation to an output of echo cancellation so that the first error signal may be obtained; after performing the K-path gain process and the K-path pre-distortion process to the downlink reference signal, employ the at least one second stage adaptive filter corresponding to the K-path pre-distorted signal to perform a second stage echo cancellation to the output of echo cancellation so that the second error signal may be obtained; then, perform the minimum value fusion process to an output of the first stage echo cancellation and an output of the second stage echo cancellation so as to obtain the residue signal, and consider the residue signal as the final output of adaptive echo cancellation. The embodiments of the present disclosure may employ a method for reducing in cascade an echo to minimize the residue signal obtained finally, which means an echo loss may be relatively large, and thus, the present disclosure realizes steadily providing a relatively high echo loss under a circumstance that a speaker suffers a relatively great distortion.

BRIEF DESCRIPTION OF THE DRAWINGS

For better clarifying embodiments of the present disclosure or prior art, a brief description of drawings needed for the description of the embodiments and prior art is provided. Obviously, the drawings which follow are the embodiments of the present disclosure. By taking effort with creativity, those skilled in the art can acquire other drawings based on the drawings provided.

DETAILED DESCRIPTION

Embodiments of the present disclosure provide a method and an apparatus for reducing an echo so as to realize steadily providing a relatively high echo loss under a circumstance that a speaker suffers a relatively great distortion.

Figure 2:
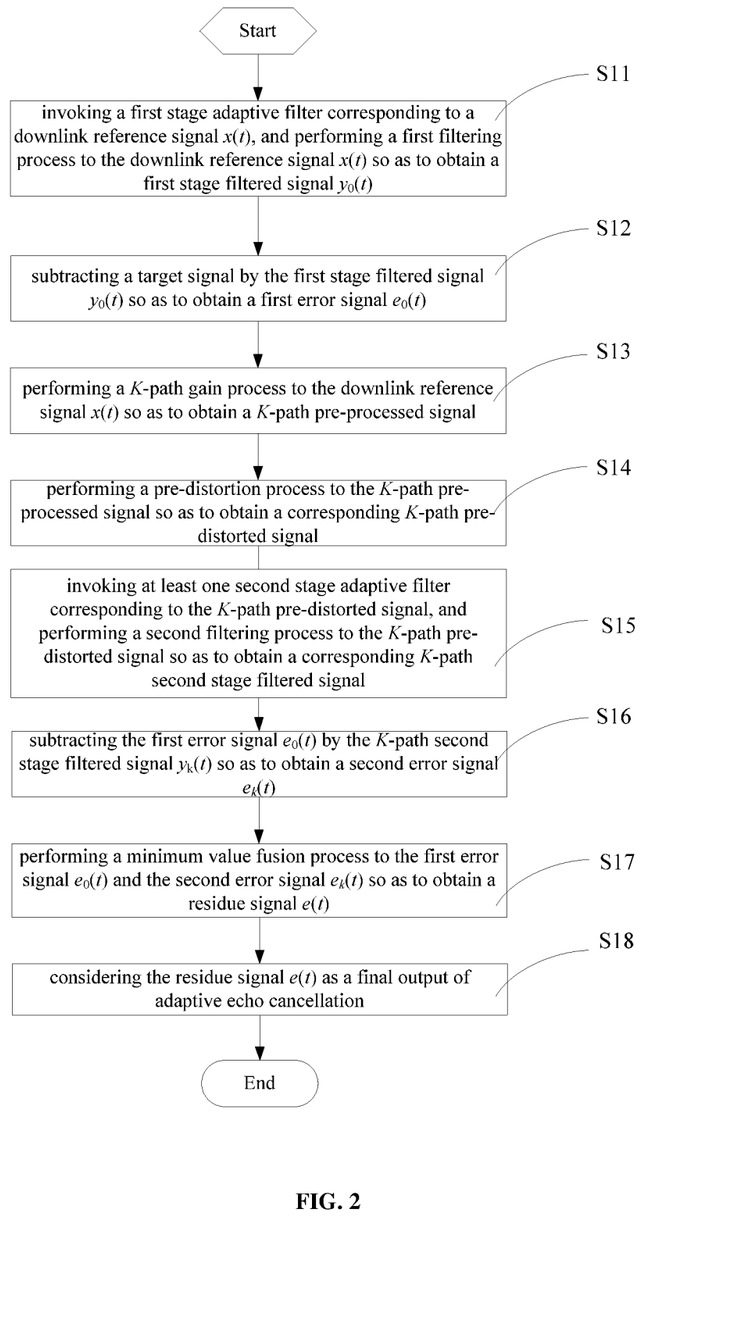
FIG. 2 schematically illustrates a flow diagram presenting a method for reducing an echo according to one embodiment in the present disclosure.

Referring to FIG. 2, a flow diagram presenting a method for reducing an echo according to one embodiment of the present disclosure is provided, and the method includes:

S11: invoking a first stage adaptive filter corresponding to a downlink reference signal x(t), and performing a first filtering process to the downlink reference signal x(t) so as to obtain a first stage filtered signal $y_0(t)$;

S12: subtracting a target signal by the first stage filtered signal $y_0(t)$ so as to obtain a first error signal $e_0(t)$, where subtracting the target signal by the first stage filtered signal is for cancelling a linear echo in the target signal;

S13: performing a K-path gain process to the downlink reference signal x(t) so as to obtain a K-path pre-processed signal, where K is a positive integer; the K-path gain process may include: multiplying the downlink reference signal x(t) by a gain $g_k$(k=1, 2, ..., K) so as to obtain a K-path pre-processed signal $p_k(t)$ (k=1, 2, ..., K), and corresponding formulas are presented in the following:

$p_1(t) = g_1 x(t),$ $p_2(t) = g_2 x(t),$ $\vdots$ $p_K(t) = g_K x(t),$ where the gains $0 \le g_k \le 1$ for k=1, 2, ..., K; specifically, the gain is selected not greater than 1 so as to avoid that the downlink reference signal generates an additional overflow distortion in a digital system;

S14: performing a pre-distortion process to the K-path pre-processed signal so as to obtain a corresponding K-path pre-distorted signal $r_k(t)$ (k=1, 2, ..., K);

S15: invoking at least one second stage adaptive filter corresponding to the K-path pre-distorted signal, and performing a second filtering process to the K-path pre-distorted signal so as to obtain a corresponding K-path second stage filtered signal $y_k(t)$;

S16: subtracting the first error signal $e_0(t)$ by the K-path second stage filtered signal $y_k(t)$ so as to obtain a second error signal $e_k(t)$ (k=1, 2, ..., K);

S17: performing a minimum value fusion process to the first error signal $e_0(t)$ and the second error signal $e_k(t)$ so as to obtain a residue signal e(t);

S18: considering the residue signal e(t) as a final output of adaptive echo cancellation.

From above, the first stage adaptive filter corresponding to the downlink reference signal may perform a first stage echo cancellation to an output of echo cancellation so that the first error signal may be obtained; after performing the K-path gain process and the K-path pre-distortion process to the downlink reference signal, the at least one second stage adaptive filter corresponding to the K-path pre-distorted signal may perform a second stage echo cancellation to the output of echo cancellation so that the second error signal may be obtained; then, the minimum value fusion process is performed to an output of the first stage echo cancellation and an output of the second stage echo cancellation so as to obtain the residue signal, and the residue signal is considered as the final output of adaptive echo cancellation. The embodiments of the present disclosure may employ a method for reducing in cascade an echo to minimize the residue signal obtained finally, which means an echo loss may be relatively large, and thus, the embodiments of the present disclosure realizes steadily providing a relatively high echo loss under a circumstance that a speaker suffers a relatively great distortion.

Specifically, an echo path model in an adaptive filter is either a time domain model or a frequency domain model. Regarding to these two models, the embodiments of the present disclosure provide following descriptions about the first stage adaptive filter corresponding to the downlink reference signal x(t) and the first error signal $e_0(t)$.

(1) if the echo path model in the first stage adaptive filter corresponding to the downlink reference signal x(t) is a time domain model $h_{0,t}$, the first error signal $e_0(t)$ is expressed as:

$$e_0(t) = d(t) - y_0(t),$$

$$y_0(t) = h_{0,t} \otimes x(t) = \sum_{m=1}^{M} h_{0,t}(m) x(t - M + m),$$

where d(t) is a target signal, $y_0(t)$ is the first stage filtered signal, $h_{0,t}$ is a M-order FIR filter at time t, $h_{0,t}=[h_{0,t}(1), h_{0,t}(2), \ldots, h_{0,t}(M)]^T$, a superscript T denotes transpose, $\otimes$ denotes convolution, x(t) is the downlink reference signal, t is a time index and M is a number of order; the order M may need to satisfy the simulated echo path model; generally, echo attenuation may last 10 ms to 1 s so that the order M ranges from 0.01 $f_s$ to $f_s$, where $f_s$ is a sampling frequency.

If the echo path model is the time domain model $h_{0,t}$, the first stage adaptive filter may employ any one from the time domain adaptive filtering algorithms, where the time domain adaptive filtering algorithms include: the Least Mean Square (LMS), the Normalized Least Mean Square (NMLS), the Affine Projection (AP), the Fast Affine Projection (FAP), the Least Square (LS), the Recursive Least Square (RLS), etc.

An embodiment of the present disclosure uses NMLS:

$$\Delta h_{0,t} = \mu_{h,0} [\Delta h_{0,t}(1), \Delta h_{0,t}(2), \ldots, \Delta h_{0,t}(M)]^T$$

$$\Delta h_{0,t}(m) = \frac{e_0(t)x(t-M+m)}{\varepsilon + \sum_{m=1}^{M} x(t-M+m)^2},$$

where $\varepsilon$ is a small positive real number used for avoiding diving by zero, $\mu_{k,0}$ is a step length of update, $0<\mu_{h,0}<2$, the superscript T denotes transpose, M is the number of order, and t is the time index.

The echo path model $h_{0,t+1}$ of the first stage adaptive filter corresponding to the downlink reference signal x(t) is updated as: $h_{0,t+1}=h_{0,t}+\Delta h_{0,t}$.

(2) if the echo path model in the first stage adaptive filter corresponding to the downlink reference signal x(t) is a frequency domain model $H_{0,t}$, the first error signal $e_0(t)$ is expressed as:

$$e_0(t)=d(t)-y_0(t),$$

$$[y_0(t-(N-M)+1), y_0(t-(N-M)+2), \ldots, y_0(T)]^T = [0_{(N-M)\times M}, I_{(N-M)\times(N-M)}]F^-[H_{0,t} \cdot R_{0,t}],$$

where d(t) is the target signal, $y_0(t)$ is the first stage filtered signal, t is the time index, N is length of a signal frame, M is the number of order, $0_{(N-M)\times M}$ is a (N–M) by M zero matrix, $I_{(N-M)\times(N-M)}$ is a (N–M) by (N–M) identity matrix, $F^-$ is an inverse discrete Fourier transform matrix, denotes a N-order vector at the time t, and $R_{0,t}=F[x(t-N+1), x(t-N+2), \ldots, x(t)]^T$, · denotes dot product, F is a discrete Fourier transform matrix, and the superscript T denotes transpose.

The order M may need to satisfy the simulated echo path model; generally, echo attenuation may last 10 ms to 1 s so that the order M ranges from 0.01 $f_s$ to $f_s$, where $f_s$ is the sampling frequency, and N may need to be greater than M.

If the echo path model is the frequency domain model $H_{0,t}$, the first stage adaptive filter may employ any one from the frequency domain adaptive filtering algorithms, where the frequency domain adaptive filtering algorithms include: the Frequency Domain Adaptive Filter (FDAF), the Multi-Delay Adaptive Filter (MDAF), the Windowing Frequency Domain Adaptive Filter (WDAF), etc. A term for updating a parameter of the first stage adaptive filter in frequency domain is $\Delta H_{0,t}$, where $\Delta H_{0,t}$ is a N-order vector with N a positive integer.

An embodiment of the present disclosure uses FDAF:

$$\Delta H_{0,t} = \mu_{H,0} \frac{R_{0,t}^* E_{0,t}}{\varepsilon + E[|R_{0,t}|^2]},$$

where $\varepsilon$ is a small positive real number used for avoiding diving by zero, a superscript * denotes conjugate, $\mu_{H,0}$ is a step length of update, $0<\mu_{H,0}<2$, $$E_{0,t}=F[e_0(t-N+1), e_0(t-N+2), \ldots, e_0(t)]^T,$$

$$R_{0,t}=F[x(t-N+1), x(t-N+2), \ldots, x(t)]^T,$$

$E[|R_{0,t}|^2]$ is an expectation of an energy spectrum of $R_{0,t}$, which is generally obtained by employing the regression method that is:

$$E[|R_{0,t}|^2]=\eta E[|R_{0,t-1}|^2]+(1-\eta)|R_{0,t}|^2,$$

where $\eta$ is an updating factor satisfying $0<\eta<1$.

The echo path model $H_{0,t+1}$ of the first stage adaptive filter corresponding to the downlink reference signal x(t) is updated as: $H_{0,t+1}=H_{0,t}+\Delta H_{0,t}$, where $\Delta H_{0,t}$ is a N-order vector with N a positive integer.

In order to further improve the aforementioned embodiment, the S14 specifically is: a K-path pre-distortion mapping function may map the K-path pre-processed signal $p_k(t)$ into the K-path pre-distorted signal $r_k(t)$, where k=1, 2, ..., K.

The K-path pre-distortion mapping function employed by the pre-distortion process is expressed as: $r_k(t)=f_k(p_k(t))$, where $r_k(t)$ is the k-th pre-distorted signal, $p_k(t)$ is the k-th pre-processed signal, $f_k(x) \neq cx$, $f_k(x) \neq c$, c is a constant, and k=1, 2, ..., K.

For convenience of designing and using the pre-distortion mapping function, normalizing the pre-distortion mapping function as:

$$r_k(t) = x_{max} f_k\left(\frac{p_k(t)}{x_{max}}\right),$$

where $x_{max}$ is a maximum amplitude of the downlink reference signal x(t), $-1 \le f_k(x) \le 1$, k=1, 2, ..., K.

There are many pre-distortion mapping functions, the formulas which are common but not limited to, are listed in the following:

$$f_k(x)=|x|^\gamma+c,$$

$$f_k(x)=\text{sign}(x)|x|^\gamma+c,$$

$$f_k(x)=\sin(cx),$$

$$f_k(x)=\tan(cx),$$

and combinations of them, such as:

$$f_k(x)=a_1|x|^{\gamma_1}+a_2 \text{sign}(x)|x|^{\gamma_2}+a_3 \sin(c_3 x)+a_4 \tan(c_4 x)+c.$$

The pre-distortion mapping function may be a piecewise function, such as:

$$f_k(x) = \begin{cases} x+c_1 & |x|<x_1 \\ \text{sign}(x)|x|^\gamma+c_2 & x_1 \le |x| < x_2 \\ c_3 & x_2 \le |x| \end{cases},$$

where c, $c_1$, $c_2$, $c_3$, $c_4$, $\gamma$, $\gamma_1$, $\gamma_2$, $a_1$, $a_2$, $a_3$, $a_4$, $x_1$, $x_2$ are all constant real numbers, and sign( ) denotes a sign function.

A reason for multiple pre-distortion mapping functions are needed for obtaining the pre-distorted signal is that distortion of a speaker possesses features of complexity and time-variance, and it is unlikely for one distortion process to effectively approach a distortion portion in an echo signal, so that the embodiments of the present disclosure employ results of different multi-path distortion processes for providing a plenty of selections to a final minimum fusion.

Specifically, an echo path model in an adaptive filter is either a time domain model or a frequency domain model. Regarding to these two models, the embodiments of the present disclosure provide following descriptions about the at least one second stage adaptive filter corresponding to the K-path pre-distorted signal and the second error signal $e_k(t)$.

(1) if an echo path model in the at least one second stage adaptive filter corresponding to the K-path pre-distorted signal is a time domain model $h_{k,t}$, the second error signal $e_k(t)$ is expressed as:

$$e_k(t) = e_0(t) - y_k(t),$$

$$y_k(t) = h_{k,t} \otimes r_k(t) = \sum_{m=1}^{M} h_{k,t}(m) r_k(t - M + m),$$

where $h_{k,t}$ is a k-th M-order FIR filter at a time t, $h_{k,t}=[h_{k,t}(1), h_{k,t}(2), \ldots, h_{k,t}(M)]^T$, the superscript T denotes transpose, $\otimes$ denotes convolution, t is the time index and M is the number of order.

The order M may need to satisfy the simulated echo path model; generally, echo attenuation may last 10 ms to 1 s so that the order M ranges from 0.01 $f_s$ to $f_s$, where $f_s$ is the sampling frequency.

If the echo path model is the time domain model $h_{k,t}$ (k=1, 2, ..., K), the at least one second stage adaptive filter may employ any one from the time domain adaptive filtering algorithms, where the time domain adaptive filtering algorithms include: the Least Mean Square (LMS), the Normalized Least Mean Square (NMLS), the Affine Projection (AP), the Fast Affine Projection (FAP), the Least Square (LS), the Recursive Least Square (RLS), etc. A term for updating a parameter of the at least one second stage adaptive filter in time domain is $\Delta h_{k,t}$ (k=1, 2, ..., K), where $\Delta h_{k,t}$ is a M-order vector with M a positive integer.

An embodiment of the present disclosure employs NMLS:

$$\Delta h_{k,t} = \mu_{h,k} [\Delta h_{k,t}(1), \Delta h_{k,t}(2), \ldots, \Delta h_{k,t}(M)]^T$$

$$\Delta h_{k,t}(m) = \frac{e_k(t) r_k(t - M + m)}{\varepsilon + \sum_{m=1}^{M} r_k(t - M + m)^2},$$

where $\varepsilon$ is a small positive real number used for avoiding diving by zero, $\mu_{h,0}$ and $\mu_{h,k}$ are the step length of update, $0<\mu_{h,0}<2$, $0<\mu_{h,k}<2$, k=1, 2, ..., K, and t is the time index.

The echo path model $h_{k,t+1}$ of the at least one second stage adaptive filter corresponding to the pre-distorted signal is updated as: $h_{k,t+1}=h_{k,t}+\Delta h_{k,t}$, where the term for updating the parameter of the at least one second stage adaptive filter in time domain is $\Delta h_{k,t}$, where $\Delta h_{k,t}$ is a M-order vector, M is a positive integer, and k=1, 2, ..., K.

(2) if the echo path model in the at least one second stage adaptive filter corresponding to the pre-distorted signal is a frequency domain model $H_{k,t}$, the second error signal $e_k(t)$ is expressed as:

$$e_k(t)=e_0(t)-y_k(t),$$

$$[y_k(t-(N-M)+1), y_k(t-(N-M)+2), \ldots, y_k(t)]^T = [0_{(N-M) \times M} I_{(N-M) \times (N-M)}] F^{-1}[H_{k,t} R_{k,t}],$$

where $y_k(t)$ is the second stage filtered signal, t is the time index, N is length of a signal frame, M is the number of order, $0_{(N-M) \times M}$ is the (N–M) by M zero matrix, $I_{(N-M) \times (N-M)}$ is the (N–M) by (N–M) identity matrix, F is the inverse discrete Fourier transform matrix, $H_{k,t}$ denotes a k-th N-order vector at the time t, $R_{k,t}=F[r_k(t-N+1), r_k(t-N+2), \ldots, r_k(t)]^T$, k=1, 2, ... K, $y_1(t), y_2(t), \ldots, y_K(t)$ are K-path filtered output signals, $\cdot$ denotes the dot product, F is the discrete Fourier transform matrix, and the superscript T denotes transpose, k=1, 2, ... K, and K is a positive integer.

The order M may need to satisfy the simulated echo path model; generally, echo attenuation may last 10 ms to 1 s so that the order M ranges from 0.01 $f_s$ to $f_s$, where $f_s$ is the sampling frequency, and N may need to be greater than M.

If the echo path model is the frequency domain model $H_{k,t}$, the at least one second stage adaptive filter may employ any one from the frequency domain adaptive filtering algorithms, where the frequency domain adaptive filtering algorithms include: the Frequency Domain Adaptive Filter (FDAF), the Multi-Delay Adaptive Filter (MDAF), the Windowing Frequency Domain Adaptive Filter (WDAF), etc. A term for updating a parameter of the at least one second stage adaptive filter in frequency domain is $\Delta H_{k,t}$, where $\Delta H_{k,t}$ is a N-order vector with N a positive integer.

An embodiment of the present disclosure employs FDAF:

$$\Delta H_{k,t} = \mu_{H,k} \frac{R_{k,t}^* E_{k,t}}{\varepsilon + E[|R_{k,t}|^2]},$$

where $\varepsilon$ is a small positive real number used for avoiding diving by zero, the superscript * denotes conjugate, $\mu_{H,k}$ is a step length of update, $0<\mu_{H,k}<2$ for k=1, 2, ..., K, $$E_{k,t}=F[e_k(t-N+1), e_k(t-N+2), \ldots, e_k(t)]^T,$$

$$R_{k,t}=F[r_k(t-N+1), r_k(t-N+2), \ldots, r_k(t)]^T,$$

$E[|R_{k,t}|^2]$ is an expectation of an energy spectrum of $R_{k,t}$, which is generally obtained by employing the regression method that is:

$$E[|R_{k,t}|^2]=\eta E[|R_{k,t-1}|^2]+(1-\eta)|R_{k,t}|^2,$$

where $\eta$ is a updating factor satisfying $0<\eta<1$.

The echo path model $H_{k,t+1}$ of the at least one second stage adaptive filter corresponding to the K-path pre-distorted signal is updated as: $H_{k,t+1}=H_{k,t}+\Delta H_{k,t}$, where $\Delta H_{k,t}$ is a N-order vector with N a positive integer.

Figure 3:
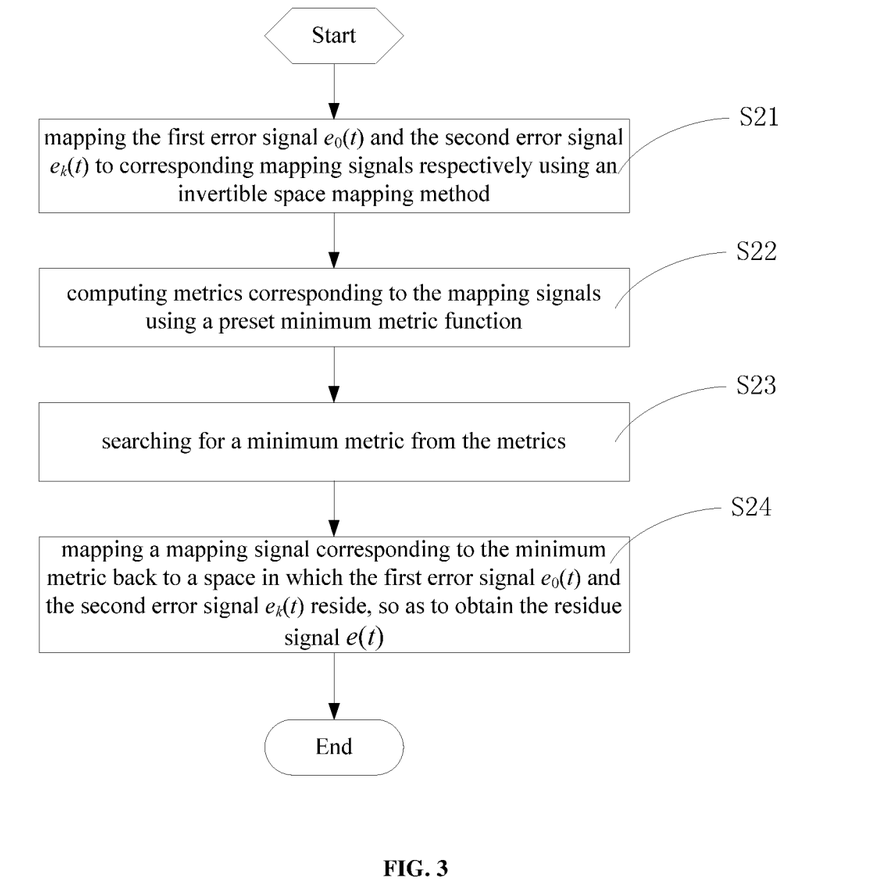
FIG. 3 schematically illustrates a flow diagram presenting a method for performing a minimum value fusion process to a first error signal and a second error signal so as to obtain a residue signal according to one embodiment in the present disclosure.

In order to further improve the aforementioned embodiment, referring to FIG. 3, the embodiment of the present disclosure provide a flow diagram presenting a method for performing a minimum value fusion process to the first error signal and the second error signal so as to obtain a residue signal, where the S17 may include: S21: mapping the first error signal $e_0(t)$ and the second error signal $e_k(t)$ (k=1, 2, ..., K) to corresponding mapping signals respectively using an invertible space mapping method; S22: computing metrics corresponding to the mapping signals using a preset minimum metric function; S23: searching for a minimum metric from the metrics; S24: mapping a mapping signal corresponding to the minimum metric back to a space in which the first error signal $e_0(t)$ and the second error signal $e_k(t)$ reside, so as to obtain the residue signal e(t).

Regarding to K+1 error signals (including the first error signal $e_0(t)$ and the second error signal $e_k(t)$ for k=1, 2, ..., K, due to adaptive filters have different parameter signals, respective remaining echoes are minimum at different time or in different space. The minimum value fusion process may use a spatial mapping method to map the K+1 error signals $e_0(t), e_1(t), \ldots, e_K(t)$ to mapping signals $S_{0,t}, S_{1,t}, \ldots, S_{K,t}$, and the preset minimum metric function may be used to compute the metrics $v_0, v_1, \ldots, v_K$ corresponding to the mapping signals $S_{0,t}, S_{1,t}, \ldots, S_{K,t}$. A minimum metric $v_{k\_min}$ is searched among the metrics, and a k_min-th mapping signal $S_{k\_min,t}$ corresponding to the minimum metric $v_{k\_min}$ is mapped back to an original space, in which the K+1 error signals reside, so as to obtain the residue signal e(t). Eventually, the residue signal e(t) is regarded as the final output of adaptive echo cancellation.

In a simplest minimum value fusion process, the spatial mapping method is short-time signal framing that:

$$S_{k,t}[e_k(t-L+1), e_k(t-L+2), \ldots, e_k(t)], k=0,1,2,\ldots,K,$$

where $S_{k,t}$ is the mapping signal, and t is the time index.

A minimum metric function is used for computing a short-time extent that:

$$v_k = f_{min}(S_{k,t}) = \sum_{l=1}^{L} |e_k(t-L+l)|, k = 0, 1, 2, \ldots, K,$$

where $v_k$ is the minimum metric, and t is the time index.

Alternatively, a minimum metric function is used for computing a short-time energy that:

$$v_k = f_{min}(S_{k,t}) = \sum_{l=1}^{L} e_k(t-L+l)^2, k = 0, 1, 2, \ldots, K,$$

where $v_k$ is the minimum metric, and t is the time index.

In the aforementioned equations, L is expressed as a short-time interval, which is a positive integer, and a value of L is between $0.001\ f_s$ and $f_s$, where $f_s$ is the sampling frequency.

The mapping signal $S_{k\_min,t}$ corresponding to the minimum short-time extent or the minimum short-time energy is selected, and a set $[e_{k\_min}(t-L+1), \ldots, e_{k\_min}(t)]$ corresponding to the mapping signal $S_{k\_min,t}$ is regards as a set of final residue signals $[e(t-L+1), \ldots, e(t)]$.

In some embodiments, the short-time interval may be overlapped so as to perform smoothing process to both ends of the short-time interval.

A more effective minimum fusion process may include: a frequency-domain transform as presented in the following that: $S_{k,t}=T_F([e_k(t-L+1), \ldots, e_k(t)])$, $k=0, 1, 2, \ldots, K$, where $S_{k,t}$ is the mapping signal, $T_F$ denotes a frequency-domain transform, L denotes the short-time interval, which is a positive integer, and the value of L is between $0.001\ f_s$ and $f_s$, where $f_s$ is the sampling frequency.

The frequency-domain transform $T_F$ may include but be not limited that the Discrete Fourier Transform (DFT), the Discrete Cosine Transform (DCT), the Karhunen-Loeve (KL) transform, the Modified Discrete Cosine Transform (MDCT), etc. The frequency-domain transform $T_F$ may be invertible and an inverse transform is expressed as $T_F^-$.

The mapping signal $S_{k,t}$ obtained by the frequency-domain transform is a vector of $L_F$ elements. For different mapping methods, $L_F$ may be different. In cases of the DFT transform, the DCT transform and the KL transform, $L_F$ is generally equal to L, and in a case of the MDCT transform, $L_F$ is equal to L/2. The minimum metric function may be a norm of the mapping signal $S_{k,t}[l]$, $l=1, 2, \ldots, L_F$: $f_{min}(x)=|x|$, and alternatively, an addition of a weighted absolute value of a real part of a number and a weighted absolute value of an imaginary part of the number:

$$f_{min}(x) = \lambda_{real}|(\text{real}(x)|^{\gamma_{real}} + \lambda_{imag}|\text{imag}(x)|^{\gamma_{imag}},$$

where $\lambda_{real}$ and $\lambda_{imag}$ are weighting factors, which are non-negative real numbers, and $\gamma_{real}$ and $\gamma_{imag}$ are order numbers, which are non-negative real numbers.

A metric of the mapping signal $S_{k,t}[l]$, $l=1, 2, \ldots, L_F$ is obtained using the minimum metric function that: $v_{k,l}=f_{min}(S_{k,t}[l])$, where $v_{k,l}$ is a minimum metric, an integer index $l=1, 2, \ldots, L_F$ and $k=0, 1, 2, \ldots, K$.

Based on the metric, the mapping signal $S_{k,t}[l]$, $l=1, 2, \ldots, L_F$ is fused as a fused signal $S_t[l]=S_{k\_l,t}[l]$, where an integer index $l=1, 2, \ldots, L_F$, and k_l satisfies the following equation that: $f_{min}(S_{k_l,t}[l])=\min([v_{0,l}, v_{1,l}, \ldots, v_{K,l}])$; at last, performing the inverse frequency-domain transform $T_F^-$, the fused signal $S_t[l]$, $l=1, 2, \ldots, L_F$ is inversely mapped to obtain the set of final residue signals that $[e(t-L+1), \ldots, e(t)]$, where $[e(t-L+1), \ldots, e(t)]=T_F^-(S_t)$.

In some embodiments, the short-time interval may be overlapped so as to perform smoothing process to both ends of the short-time interval.

Specifically, in the aforementioned embodiments of the present disclosure, K is always a positive integer.

Further, in order to prove that the embodiments of the present disclosure realize steadily providing a relatively high echo loss under a circumstance that a speaker suffers a relatively great distortion, practical tests are performed.

A signal sampling frequency is 8000 Hz. The first stage adaptive filter and the at least one second stage adaptive filter both are FDAF. For the second stage, a two-path pre-distortion process is performed, where the gain for each path is 1, and the pre-distortion mapping functions: $f_1(x)=\text{sign}(x)|x|^{0.1}$, $f_2(x)=\text{sign}(x)|x|^{0.2}$.

The spatial mapping in the minimum fusion process employs DCT mapping, L=320, M=192, N=512, the minimum metric function is obtained by taking absolute value.

Comparing processing results using the method provided in the present disclosure with processing results using a conventional method, it is noted that a signal processed using the method provided in the present disclosure is smaller than a signal processed using the conventional method, and the present disclosure achieves an improvement of more than 4.2 dB.

Corresponding to the aforementioned embodiments of the method for reducing an echo, the embodiments of the present disclosure further provide an apparatus for reducing an echo.

Figure 4:
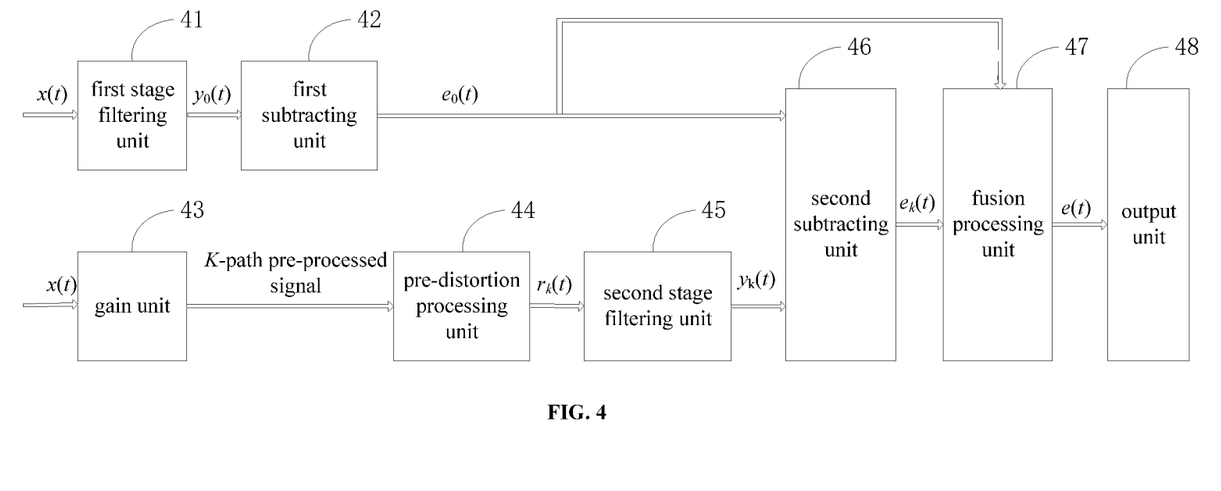
FIG. 4 schematically illustrates a structural diagram presenting an apparatus for reducing an echo according to one embodiment in the present disclosure.

Referring to FIG. 4, a structural diagram presenting an apparatus for reducing an echo according to one embodiment of the present disclosure is provided, and the apparatus includes: a first stage filtering unit 41, adapted for invoking a first stage adaptive filter corresponding to a downlink reference signal x(t), and performing a first filtering process to the downlink reference signal x(t) so as to obtain a first stage filtered signal $y_0(t)$; a first subtracting unit 42, adapted for subtracting a target signal by the first stage filtered signal $y_0(t)$ so as to obtain a first error signal $e_0(t)$, where subtracting the target signal by the first stage filtered signal is for cancelling a linear echo in the target signal; a gain unit 43, adapted for performing a K-path gain process to the downlink reference signal x(t) so as to obtain a K-path pre-processed signal, where K is a positive integer; the K-path gain process may include: multiplying the downlink reference signal x(t) by a gain $g_k$ (k=1, 2, ..., K) so as to obtain a K-path pre-processed signal $p_k(t)$ (k=1, 2, ..., K), and corresponding formulas are presented in the following:

$$p_1(t) = g_1 x(t),$$

$$p_2(t) = g_2 x(t),$$

$$\vdots$$

$$p_K(t) = g_K x(t),$$

where the gains $0 \leq g_k \leq 1$ for k=1, 2, ..., K; specifically, the gain is selected not greater than 1 so as to avoid that the downlink reference signal generates an additional overflow distortion in a digital system; a pre-distortion processing unit 44, adapted for performing a pre-distortion process to the K-path pre-processed signal so as to obtain a corresponding K-path pre-distorted signal $r_k(t)$ (k=1, 2, ..., K); a second stage filtering unit 45, adapted for invoking at least one second stage adaptive filter corresponding to the K-path pre-distorted signal, and performing a second filtering process to the K-path pre-distorted signal so as to obtain a corresponding K-path second stage filtered signal $y_k(t)$; a second subtracting unit 46, adapted for subtracting the first error signal $e_0(t)$ by the K-path second stage filtered signal $y_k(t)$ so as to obtain a second error signal $e_k(t)$ (k=1, 2, ..., K); a fusion processing unit 47, adapted for performing a minimum value fusion process to the first error signal $e_0(t)$ and the second error signal $e_k(t)$ so as to obtain a residue signal e(t); an output unit 48, adapted for considering the residue signal e(t) as a final output of adaptive echo cancellation.

From above, the first stage adaptive filter corresponding to the downlink reference signal may perform a first stage echo cancellation to an output of echo cancellation so that the first error signal may be obtained; after performing the K-path gain process and the K-path pre-distortion process to the downlink reference signal, the at least one second stage adaptive filter corresponding to the K-path pre-distorted signal may perform a second stage echo cancellation to the output of echo cancellation so that the second error signal may be obtained; then, the minimum value fusion process is performed to an output of the first stage echo cancellation and an output of the second stage echo cancellation so as to obtain the residue signal, and the residue signal is considered as the final output of adaptive echo cancellation. The embodiments of the present disclosure may employ a method for reducing in cascade an echo to minimize the residue signal obtained finally, which means an echo loss may be relatively large, and thus, the present disclosure realizes steadily providing a relatively high echo loss under a circumstance that a speaker suffers a relatively great distortion.

Specifically, an echo path model in an adaptive filter is either a time domain model or a frequency domain model. Regarding to these two models, the embodiments of the present disclosure provide following descriptions about the first stage adaptive filter corresponding to the downlink reference signal x(t) and the first error signal $e_0(t)$.

(1) if the echo path model in the first stage adaptive filter corresponding to the downlink reference signal x(t) is a time domain model $h_{0,t}$ the first error signal $e_0(t)$ is expressed as:

$$e_0(t) = d(t) - y_0(t),$$

$$y_0(t) = h_{0,t} \otimes x(t) = \sum_{m=1}^{M} h_{0,t}(m) x(t - M + m),$$

where d(t) is a target signal, $y_0(t)$ is the first stage filtered signal, $h_{0,t}$ is an M-order FIR filter at time t, $h_{0,t}=[h_{0,t}(1), h_{0,t}(2), \ldots, h_{0,t}(M)]^T$, a superscript T denotes transpose, $\otimes$ denotes convolution, x(t) is the downlink reference signal, t is a time index and M is a number of order.

The order M may need to satisfy the simulated echo path model; generally, echo attenuation may last 10 ms to 1 s so that the order M ranges from 0.01 $f_s$ to $f_s$, where $f_s$ is a sampling frequency.

If the echo path model is the time domain model $h_{0,t}$, the first stage adaptive filter may employ any one from the time domain adaptive filtering algorithms, where the time domain adaptive filtering algorithms include: the Least Mean Square (LMS), the Normalized Least Mean Square (NMLS), the Affine Projection (AP), the Fast Affine Projection (FAP), the Least Square (LS), the Recursive Least Square (RLS), etc. A term for updating a parameter of the first stage adaptive filter in time domain is $\Delta h_{0,t}$, where $\Delta h_{0,t}$ is a M-order vector with M a positive integer.

An embodiment of the present disclosure employs NMLS:

$$\Delta h_{0,t} = \mu_{h,0} [\Delta h_{0,t}(1), \Delta h_{0,t}(2), \ldots, \Delta h_{0,t}(M)]^T$$

$$\Delta h_{0,t}(m) = \frac{e_0(t) x(t - M + m)}{\varepsilon + \sum_{m=1}^{M} x(t - M + m)^2},$$

where $\epsilon$ is a small positive real number used for avoiding diving by zero, $\mu_{h,0}$ is a step length of update, $0 < \mu_{h,0} < 2$, the superscript T denotes transpose, M is the number of order, and t is the time index.

The echo path model $h_{0,t+1}$ of the first stage adaptive filter corresponding to the downlink reference signal x(t) is updated as: $h_{0,t+1} = h_{0,t} + \Delta h_{0,t}$.

(2) if the echo path model in the first stage adaptive filter corresponding to the downlink reference signal x(t) is a frequency domain model $H_{0,t}$, the first error signal $e_0(t)$ is expressed as:

$$e_0(t) = d(t) - y_0(t),$$

$$[y_0(t-(N-M)+1), y_0(t-(N-M)+2), \ldots, y_0(t)]^T = [0_{(N-M) \times M} I_{(N-M) \times (N-M)}] F^- [H_{0,t} \cdot R_{0,t}],$$

where d(t) is the target signal, $y_0(t)$ is the first stage filtered signal, t is the time index, N is length of a signal frame, M is the number of order, $0_{(N-M) \times M}$ is a (N-M) by M zero matrix, $I_{(N-M) \times (N-M)}$ is a (N-M) by (N-M) identity matrix, $F^-$ is an inverse discrete Fourier transform matrix, denotes a N-order vector at the time t, and $R_{0,t} = F[x(t-N+1), x(t-N+2), \ldots, x(t)]^T$, $\cdot$ denotes dot product, F is a discrete Fourier transform matrix, and the superscript T denotes transpose.

The order M may need to satisfy the simulated echo path model; generally, echo attenuation may last 10 ms to 1 so that the order M ranges from 0.01 $f_s$ to $f_s$, where $f_s$ is the sampling frequency, and N may need to be greater than M.

If the echo path model is the frequency domain model $H_{0,t}$, the first stage adaptive filter may employ any one from the frequency domain adaptive filtering algorithms, where the frequency domain adaptive filtering algorithms include: the Frequency Domain Adaptive Filter (FDAF), the Multi-Delay Adaptive Filter (MDAF), the Windowing Frequency Domain Adaptive Filter (WDAF), etc. A term for updating a parameter of the first stage adaptive filter in frequency domain is $\Delta H_{0,t}$, where $\Delta H_{0,t}$ is a N-order vector with N a positive integer.

The echo path model $H_{0,t+1}$ of the first stage adaptive filter corresponding to the downlink reference signal x(t) is updated as: $H_{0,t+1} = H_{0,t} + \Delta H_{0,t}$, where $\Delta H_{0,t}$ is a N-order vector with N a positive integer.

A reason for multiple pre-distortion mapping functions are needed for obtaining the pre-distorted signal is that distortion of a speaker possesses features of complexity and time-variance, and it is unlikely for one distortion process to effectively approach a distortion portion in an echo signal, so that the embodiments of the present disclosure employ results of different multi-path distortion processes for providing a plenty of selections to a final minimum fusion.

Specifically, an echo path model in an adaptive filter is either a time domain model or a frequency domain model. Regarding to these two models, the embodiments of the present disclosure provide following descriptions about the at least one second stage adaptive filter corresponding to the pre-distorted signal and the second error signal $e_k(t)$.

(1) if an echo path model in the at least one second stage adaptive filter corresponding to the pre-distorted signal is a time domain model $h_{k,t}$, the second error signal $e_k(t)$ is expressed as:

$$e_k(t) = e_0(t) - y_k(t),$$

$$y_k(t) = h_{k,t} \otimes r_k(t) = \sum_{m=1}^{M} h_{k,t}(m) r_k(t - M + m),$$

where $h_{k,t}$ is a k-th M-order FIR filter at a time t, $h_{k,t}=[h_{k,t}(1), h_{k,t}(2), \ldots, h_{k,t}(M)]^T$, the superscript T denotes transpose, $\otimes$ denotes convolution, t is the time index and M is the number of order.

The order M may need to satisfy the simulated echo path model; generally, echo attenuation may last 10 ms to 1 s so that the order M ranges from 0.01 $f_s$ to $f_s$, where $f_s$ is the sampling frequency.

If the echo path model is the time domain model $h_{k,t}$ (k=1, 2, \ldots, K), the at least one second stage adaptive filter may employ any one from the time domain adaptive filtering algorithms, where the time domain adaptive filtering algorithms include: the Least Mean Square (LMS), the Normalized Least Mean Square (NMLS), the Affine Projection (AP), the Fast Affine Projection (FAP), the Least Square (LS), the Recursive Least Square (RLS), etc. A term for updating a parameter of the at least one second stage adaptive filter in time domain is $\Delta h_{k,t}$ (k=1, 2, \ldots, K), where $\Delta h_{k,t}$ is a M-order vector with M a positive integer.

The echo path model $h_{k,t+1}$ of the at least one second stage adaptive filter corresponding to the K-path pre-distorted signal is updated as: $h_{k,t+1}=h_{k,t}+\Delta h_{k,t}$, where the term for updating the parameter of the at least one second stage adaptive filter in time domain is $\Delta h_{k,t}$, where $\Delta h_{k,t}$ is a M-order vector with M a positive integer, and k=1, 2, \ldots, K.

(2) if the echo path model in the at least one second stage adaptive filter corresponding to the pre-distorted signal is a frequency domain model $H_{k,t}$, the second error signal $e_k(t)$ is expressed as:

$$e_k(t)=e_0(t)-y_k(t).$$

$$[y_k(t-(N-M)+1), y_k(t-(N-M)+2), \ldots, y_k(t)]^T = [0_{(N-M)\times M} I_{(N-M)\times(N-M)}]F^{-}\cdot[H_{k,t}R_{k,t}],$$

where $y_k(t)$ is the second stage filtered signal, t is the time index, N is length of a signal frame, M is the number of order, $0_{(N-M)\times M}$ is the (N−M) by M zero matrix, $I_{(N-M)\times(N-M)}$ is the (N−M) by (N−M) identity matrix, $F^{-}$ is the inverse discrete Fourier transform matrix, $H_{k,t}$ denotes a k-th N-order vector at the time t, $R_{k,t}=F[r_k(t-N+1), r_k(t-N+2), \ldots, r_k(t)]^T$, k=1, 2, \ldots, K, $y_1(t), y_2(t), \ldots, y_K(t)$ are K-path filtered output signals, · denotes the dot product, F is the discrete Fourier transform matrix, and the superscript T denotes transpose, k=1, 2, \ldots, K, and K is a positive integer.

The order M may need to satisfy the simulated echo path model; generally, echo attenuation may last 10 ms to 1 s so that the order M ranges from 0.01 $f_s$ to $f_s$, where $f_s$ is the sampling frequency, and N may need to be greater than M.

If the echo path model is the frequency domain model $H_{k,t}$, the at least one second stage adaptive filter may employ any one from the frequency domain adaptive filtering algorithms, where the frequency domain adaptive filtering algorithms include: the Frequency Domain Adaptive Filter (FDAF), the Multi-Delay Adaptive Filter (MDAF), the Windowing Frequency Domain Adaptive Filter (WDAF), etc. A term for updating a parameter of the at least one second stage adaptive filter in frequency domain is $\Delta H_{k,t}$, where $\Delta H_{k,t}$ is a N-order vector with N a positive integer.

The echo path model $H_{k,t+1}$ of the at least one second stage adaptive filter corresponding to the K-path pre-distorted signal is updated as: $H_{k,t+1}=H_{k,t}+\Delta H_{k,t}$, where $\Delta H_{k,t}$ is a N-order vector with N a positive integer and k=1, 2, \ldots, K.

Figure 5:
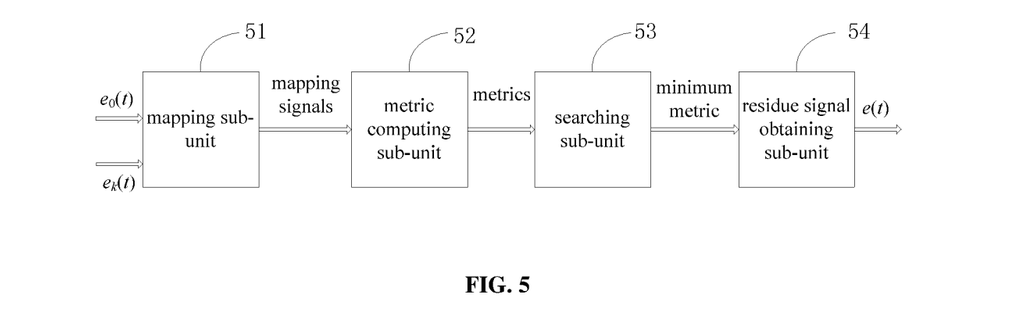
FIG. 5 schematically illustrates a structural diagram presenting a fusion process unit according to one embodiment in the present disclosure.

In order to further improve the aforementioned embodiment, referring to FIG. 5, the embodiment of the present disclosure provide a structural diagram for a fusion processing unit, which may include: a mapping sub-unit 51, adapted for mapping the first error signal $e_0(t)$ and the second error signal $e_k(t)$ (k=1, 2, \ldots, K) to corresponding mapping signals respectively using an invertible space mapping method; a metric computing sub-unit 52, adapted for computing metrics corresponding to the mapping signals using a preset minimum metric function; a searching sub-unit 53, adapted for searching for a minimum metric from the metrics; a residue signal obtaining sub-unit 54, adapted for mapping a mapping signal corresponding to the minimum metric back to a space in which the first error signal $e_0(t)$ and the second error signal $e_k(t)$ reside, so as to obtain the residue signal e(t).

Regarding to K+1 error signals (including the first error signal $e_0(t)$ and the second error signal $e_k(t)$ for k=1, 2, \ldots, K, due to adaptive filters have different parameter signals, respective remaining echoes are minimum at different time or in different space. The minimum value fusion process may use a spatial mapping method to map the K+1 error signals $e_0(t), e_1(t), \ldots, e_K(t)$ to mapping signals $S_{0,t}, S_{1,t}, \ldots, S_{K,t}$, and the preset minimum metric function may be used to compute the metrics $v_0, v_1, \ldots, v_K$ corresponding to the mapping signals $S_{0,t}, S_{1,t}, \ldots, S_{K,t}$. A minimum metric $v_{k\_min}$ is searched among the metrics, and a k_min-th mapping signal $S_{k\_min,t}$ corresponding to the minimum metric $v_{k\_min}$ is mapped back to an original space, in which the K+1 error signals reside, so as to obtain the residue signal e(t). Eventually, the residue signal e(t) is regarded as the final output of adaptive echo cancellation.

In a simplest minimum value fusion process, the spatial mapping method is short-time signal framing that:

$$S_{k,t}[e_k(t-L+1), e_k(t-L+2), \ldots, e_k(t)], k=0,1,2, \ldots, K,$$

where $S_{k,t}$ is the mapping signal, and t is the time index.

A minimum metric function is used for computing a short-time extent that:

$$v_k = f_{min}(S_{k,t}) = \sum_{l=1}^{L} |e_k(t-L+l)|, k = 0, 1, 2, \ldots, K,$$

where $v_k$ is the minimum metric, and t is the time index.

Alternatively, a minimum metric function is used for computing a short-time energy that:

$$v_k = f_{min}(S_{k,t}) = \sum_{l=1}^{L} e_k(t - L + l), k = 0, 1, 2, \ldots, K,$$

where $v_k$ is the minimum metric, and t is the time index.

In the aforementioned equations, L is expressed as a short-time interval, which is a positive integer, and a value of L is between 0.001 $f_s$ and $f_s$, where $f_s$ is the sampling frequency.

The mapping signal $S_{k\_min,t}$ corresponding to the minimum short-time extent or the minimum short-time energy is selected, and a set $[e_{k\_min}(t-L+1), \ldots, e_{k\_min}(t)]$ corresponding to the mapping signal $S_{k\_min,t}$ is regards as a set of final residue signals $[e(t-L+1), \ldots, e(t)]$.

In some embodiments, the short-time interval may be overlapped so as to perform smoothing process to both ends of the short-time interval.

A more effective minimum fusion process may include: a frequency-domain transform as presented in the following that: $S_{k,t}=T_F([e_k(t-L+1), \ldots, e_k(t)])$, k=0, 1, 2, . . . , K, where $S_{k,t}$ is the mapping signal, $T_F$ denotes a frequency-domain transform, L denotes the short-time interval, which is a positive integer, and the value of L is between 0.001 $f_s$ and $f_s$, where $f_s$ is the sampling frequency.

The frequency-domain transform $T_F$ may include but be not limited that the Discrete Fourier Transform (DFT), the Discrete Cosine Transform (DCT), the Karhunen-Loeve (KL) transform, the Modified Discrete Cosine Transform (MDCT), etc. The frequency-domain transform $T_F$ may be invertible and an inverse transform is expressed as $T_F^-$.

The mapping signal $S_{k,t}$ obtained by the frequency-domain transform is a vector of $L_F$ elements. For different mapping methods, $L_F$ may be different. In cases of the DFT transform, the DCT transform and the KL transform, $L_F$ is generally equal to L, and in a case of the MDCT transform, $L_F$ is equal to L/2. The minimum metric function may be a norm of the mapping signal $S_{k,t}[l]$, l=1, 2, . . . , $L_F$: $f_{min}(x)=|x|$, and alternatively, an addition of a weighted absolute value of a real part of a number and a weighted absolute value of an imaginary part of the number:

$$f_{min}(x)=\lambda_{real}|\text{real}(x)|^{\gamma_{real}}+\lambda_{imag}|\text{imag}(x)|^{\gamma_{imag}},$$

where $\lambda_{real}$ and $\lambda_{imag}$ are weighting factors, which are non-negative real numbers, and $\gamma_{real}$ and $\gamma_{imag}$ are order numbers, which also are non-negative real numbers.

A metric of the mapping signal $S_{k,t}[l]$, l=1, 2, . . . , $L_F$ is obtained using the minimum metric function that: $v_{k,l}=f_{min}(S_{k,t}[l])$, where $v_{k,l}$ is a minimum metric, an integer index l=1, 2, . . . , $L_F$ and k=0, 1, 2, . . . , K.

Based on the metric, the mapping signal $S_{k,t}[l]$, l=1, 2, . . . , $L_F$ is fused as a fused signal $S_t[l]=S_{k\_l,t}[l]$, where an integer index l=1, 2, . . . , $L_F$, and k_l satisfies the following equation that: $f_{min}(S_{k_l,t}[l])=\min([v_{0,l}, v_{1,l}])$; at last, performing the inverse frequency-domain transform $T_F^-$, the fused signal $S_t[l]$, l=1, 2, . . . , $L_F$ is inversely mapped to obtain the set of final residue signals that $[e(t-L+1), e(t)]$, where $[e(t-L+1), \ldots, e(t)]=T_F^-(S_t)$.

In some embodiments, the short-time interval may be overlapped so as to perform smoothing process to both ends of the short-time interval.

Specifically, in the aforementioned embodiments of the present disclosure, K is always a positive integer.

Specifically, for the embodiments of the apparatus for reducing an echo, the working principle of each component refers to the corresponding embodiments of the method for reducing an echo, thus no more repetition is provided.

Based on the aforementioned description of the embodiments of the present disclosure, those skilled in the art can realize and implement the embodiments of the present disclosure. Modifications to the embodiments of the present disclosure are obvious to those skilled in the art. Without departing from the spirit or scope of the disclosure, the principles defined in the present disclosure can be applied to other embodiments. Accordingly, the present disclosure is not limited to the embodiments in the present disclosure but a largest scope in accordance with the principles and novelties disclosed in the present disclosure.

What is claimed is:

1. A method for reducing an echo, comprising:
   invoking a first stage adaptive filter corresponding to a downlink reference signal x(t), and performing a first filtering process to the downlink reference signal x(t) so as to obtain a first stage filtered signal $y_0(t)$;
   subtracting a target signal by the first stage filtered signal $y_0(t)$ so as to obtain a first error signal $e_0(t)$;
   performing a K-path gain process to the downlink reference signal x(t) so as to obtain a K-path pre-processed signal, where K is a positive integer;
   performing a pre-distortion process to the K-path pre-processed signal so as to obtain a corresponding K-path pre-distorted signal $r_k(t)$ (k=1, 2, . . . , K);
   invoking at least one second stage adaptive filter corresponding to the K-path pre-distorted signal, and performing a second filtering process to the K-path pre-distorted signal so as to obtain a corresponding K-path second stage filtered signal $y_k(t)$;
   subtracting the first error signal $e_0(t)$ by the K-path second stage filtered signal $y_k(t)$ so as to obtain a second error signal $e_k(t)$, wherein k=1, 2, . . . , K;
   performing a minimum value fusion process to the first error signal $e_0(t)$ and the second error signal $e_k(t)$ so as to obtain a residue signal e(t); and
   considering the residue signal e(t) as a final output of adaptive echo cancellation.

2. The method according to claim 1, wherein, if an echo path model in the first stage adaptive filter corresponding to the downlink reference signal x(t) is a time domain model $h_{0,t}$, the first error signal $e_0(t)$ is expressed as:

$$e_0(t) = d(t) - y_0(t),$$

$$y_0(t) = h_{0,t} \otimes x(t) = \sum_{m=1}^{M} h_{0,t}(m)x(t - M + m),$$

wherein d(t) is a target signal, $y_0(t)$ is the first stage filtered signal, $h_{0,t}$ is a M-order FIR filter at time t, $h=[h_{0,t}(1), h_{0,t}(2), \ldots, h_{0,t}(M)]^T$, a superscript T denotes transpose, $\otimes$ denotes convolution, x(t) is the downlink reference signal, t is a time index, M is a number of order, $h_{0,t}$ is a filter coefficient of the M-order FIR filter $h_{0,t}$ at time t, and m denotes an integer index increasing from 1 to M.

3. The method according to claim 2, wherein, if the echo path model is a time domain model $h_{0,t}$, the echo path model $h_{0,t+1}$ of the first stage adaptive filter corresponding to the downlink reference signal x(t) is updated as:

$$h_{0,t+1}=h_{0,t}+\Delta h_{0,t},$$

wherein $h_{0,t+1}$ is a M-order FIR filter at time t+1, $\Delta h_{0,t}$ is a term for updating a parameter of the first stage adaptive filter in time domain, where $\Delta h_{0,t}$ is a M-order vector with M a positive integer.

4. The method according to claim 1, wherein, if an echo path model in the first stage adaptive filter corresponding to the downlink reference signal x(t) is a frequency domain model $H_{0,t}$, the first error signal $e_0(t)$ is expressed as:

$$e_0(t)=d(t)-y_0(t),$$

$$[y_0(t-(N-M)+1), y_0(t-(N-M)+2), \ldots, y_0(t)]^T = [0_{(N-M)\times M} I_{(N-M)\times(N-M)}]F^-[H_{0,t} R_{0,t}],$$

wherein d(t) is the target signal, $y_0(t)$ is the first stage filtered signal, t is a time index, a superscript T denotes transpose, N is length of a signal frame, M is a number of order, $0_{(N-M)\times M}$ is a (N-M) by M zero matrix, $I_{(N-M)\times M}$ is a (N-M) by (N-M) identity matrix, $F^-$ is an inverse discrete Fourier transform matrix, $H_{0,t}$ denotes a N-order vector at the time t, and $R_{0,t}=F[x(t-N+1), x(t-N+2), \ldots, x(t)]^T$.

5. The method according to claim 4, wherein, if the echo path model is a frequency domain model $H_{0,t}$, the echo path model $H_{0,t+1}$ of the first stage adaptive filter corresponding to the downlink reference signal x(t) is updated as:

$$H_{0,t+1}=H_{0,t}+\Delta H_{0,t},$$

wherein $H_{0,t+1}$ denotes a N-order vector at the time t+1, $\Delta H_{0,t}$ is a term for updating a parameter of the first stage adaptive filter in frequency domain, where $\Delta H_{0,t}$ is a N-order vector with N a positive integer.

6. The method according to claim 1, wherein the pre-distortion mapping function employed by the pre-distortion process is expressed as:

$$r_k(t)=f_k(p_k(t)),$$

wherein $r_k(t)$ is the k-th pre-distorted signal, $p_k(t)$ is the k-th pre-processed signal, $f_k(x) \neq cx$, $f_k(x) \neq c$, x denotes $p_k(t)$, $f_k(x)$ denotes the pre-distortion mapping function, c is a constant, and k=1, 2, ..., K.

7. The method according to claim 1, wherein, if an echo path model in the at least one second stage adaptive filter corresponding to the K-path pre-distorted signal is a time domain model $h_{k,t}$, the second error signal is expressed as:

$$e_k(t) = e_0(t) - y_k(t),$$

$$y_k(t) = h_{k,t} \otimes r_k(t) = \sum_{m=1}^{M} h_{k,t}(m) r_k(t - M + m),$$

wherein $h_{k,t}$ is a k-th M-order FIR filter at a time t, k=1, 2, ..., K, $h_{k,t}=[h_{k,t}(1), h_{k,t}(2), \ldots, h_{k,t}(M)]^T$, the superscript T denotes transpose, denotes convolution, t is a time index, M is a number of order, and m denotes an integer index increasing from 1 to M.

8. The method according to claim 7, wherein, if the echo path model is a time domain model $h_{k,t}$, the echo path model $h_{k,t+1}$ of the at least one second stage adaptive filter corresponding to the K-path pre-distorted signal is updated as:

$$h_{k,t+1}=h_{k,t}+\Delta h_{k,t},$$

wherein $h_{k,t+1}$ is a k-th M-order FIR filter at a time t+1, $\Delta h_{k,t}$ is the term for updating the parameter of the at least one second stage adaptive filter in time domain, where $\Delta h_{k,t}$ is a M-order vector with M a positive integer, and k=1, 2, ..., K.

9. The method according to claim 1, wherein, if an echo path model in the at least one second stage adaptive filter corresponding to the K-path pre-distorted signal is a frequency domain model $H_{k,t}$, the second error signal $e_k(t)$ is expressed as:

$$e_k(t)=e_0(t)-\otimes,$$

$$[y_k(t-(N-M)+1), y_k(t-(N-M)+2), \ldots, y_k(t)]^T = [0_{(N-M)\times M} I_{(N-M)\times(N-M)}]F^-[H_{k,t} R_{k,t}],$$

wherein $y_k(t)$ is the K-path second stage filtered signal, t is a time index, a superscript T denotes transpose, N is length of a signal frame, M is a number of order, $0_{(N-M)\times M}$ is a (N-M) by M zero matrix, $I_{(N-M)\times(N-M)}$ is a (N-M) by (N-M) identity matrix, $F^-$ is an inverse discrete Fourier transform matrix, $H_{k,t}$ denotes a k-th N-order vector at the time t, $R_{k,t}=F[r_k(t-N+1), r_k(t-N+2), \ldots, r_k(t)]^T$, k=1, 2, ..., K.

10. The method according to claim 9, wherein, if the echo path model is a frequency domain model $H_{k,t}$, the echo path model $H_{k,t+1}$ of the at least one second stage adaptive filter corresponding to the pre-distorted signal is updated as:

$$H_{k,t+1}=H_{k,t}+\Delta H_{k,t},$$

wherein $H_{k,t+1}$ denotes a k-th N-order vector at the time t+1, $\Delta H_{k,t}$ is a term for updating a parameter of the at least one second stage adaptive filter in frequency domain, $\Delta H_{k,t}$ is a N-order vector, and N is a positive integer.

11. The method according to claim 1, wherein performing a minimum value fusion process to the first error signal $e_0(t)$ and the second error signal $e_k(t)$ (k=1, 2, ..., K) so as to obtain a residue signal, comprising:
   mapping the first error signal $e_0(t)$ and the second error signal $e_k(t)$ (k=1, 2, ..., K) to corresponding mapping signals respectively using an invertible space mapping method;
   computing metrics corresponding to the mapping signals using a preset minimum metric function;
   searching for a minimum metric from the metrics; and
   mapping a mapping signal corresponding to the minimum metric back to a space in which the first error signal $e_0(t)$ and the second error signal $e_k(t)$ reside, so as to obtain the residue signal e(t).

12. An apparatus for reducing an echo, comprising:
   a first stage filtering unit, configured for invoking a first stage adaptive filter corresponding to a downlink reference signal x(t), and performing a first filtering process to the downlink reference signal x(t) so as to obtain a first stage filtered signal $y_0(t)$;
   a first subtracting unit, configured for subtracting a target signal by the first stage filtered signal $y_0(t)$ so as to obtain a first error signal $e_0(t)$;
   a gain unit, configured for performing a K-path gain process to the downlink reference signal x(t) so as to obtain a K-path pre-processed signal, where K is a positive integer;
   a pre-distortion processing unit, configured for performing a pre-distortion process to the K-path pre-processed signal so as to obtain a corresponding K-path pre-distorted signal $r_k(t)$ (k=1, 2, ..., K);
   a second stage filtering unit, configured for invoking at least one second stage adaptive filter corresponding to the K-path pre-distorted signal, and performing a second filtering process to the K-path pre-distorted signal so as to obtain a corresponding K-path second stage filtered signal $y_k(t)$;
   a second subtracting unit, configured for subtracting the first error signal $e_0(t)$ by the K-path second stage filtered signal $y_k(t)$ so as to obtain a second error signal $e_k(t)$, wherein k=1, 2, ..., K;

a fusion processing unit, configured for performing a minimum value fusion process to the first error signal $e_0(t)$ and the second error signal $e_k(t)$ so as to obtain a residue signal e(t); and an output unit, configured for considering the residue signal e(t) as a final output of adaptive echo cancellation.

13. The apparatus according to claim 12, wherein, if an echo path model in the first stage adaptive filter corresponding to the downlink reference signal x(t) is a time domain model $h_{0,t}$, the first error signal $e_0(t)$ is expressed as:

$$e_0(t) = d(t) - y_0(t),$$

$$y_0(t) = h_{0,t} \otimes x(t) = \sum_{m=1}^{M} h_{0,t}(m) x(t-M+m),$$

wherein d(t) is a target signal, $y_0(t)$ is the first stage filtered signal, $h_{0,t}$ is a M-order FIR filter at time t, $h_{0,t}=[h_{0,t}(1), h_{0,t}(2), \ldots, h_{0,t}(M)]^T$, a superscript T denotes transpose, ⊗ denotes convolution, x(t) is the downlink reference signal, t is a time index, M is a number of order, $h_{0,t}$ is a filter coefficient of the M-order FIR filter $h_{0,t}$ at time t, and m denotes an integer index increasing from 1 to M.

14. The apparatus according to claim 13, wherein, if the echo path model is a time domain model $h_{0,t}$, the echo path model $h_{0,t+1}$ of the first stage adaptive filter corresponding to the downlink reference signal x(t) is updated as:

$$h_{0,t+1}=h_{0,t}+\Delta h_{0,t},$$

wherein $h_{0,t+1}$ is a M-order FIR filter at time t+1, $\Delta h_{0,t}$ is a term for updating a parameter of the first stage adaptive filter in time domain, where $\Delta h_{0,t}$ is a M-order vector with M a positive integer.

15. The apparatus according to claim 12, wherein, if an echo path model in the first stage adaptive filter corresponding to the downlink reference signal x(t) is a frequency domain model $H_{0,t}$, the first error signal $e_0(t)$ is expressed as:

$$e_0(t)=d(t)-y_0(t),$$

$$[y_0(t-(N-M)+1), y_0(t-(N-M)+2), \ldots, y_0(t)]^T = [0_{(N-M)\times M} I_{(N-M)\times(N-M)}]F^-[H_{0,t} R_{0,t}],$$

wherein d(t) is a target signal, $y_0(t)$ is the first stage filtered signal, t is a time index, a superscript T denotes transpose, N is length of a signal frame, M is a number of order, $0_{(N-M)\times M}$ is a (N−M) by M zero matrix, $I_{(N-M)\times(N-M)}$ is a (N−M) by (N−M) identity matrix, $F^-$ is an inverse discrete Fourier transform matrix, $H_{0,t}$ denotes a N-order vector at the time t, and $R_{0,t}=F[x(t-N+1), x(t-N+2), \ldots, x(t)]^T$.

16. The apparatus according to claim 15, wherein, if the echo path model is a frequency domain model $H_{0,t}$, the echo path model $H_{0,t+1}$ of the first stage adaptive filter corresponding to the downlink reference signal x(t) is updated as:

$$H_{0,t+1}=H_{0,t}+\Delta H_{0,t},$$

wherein $H_{0,t+1}$ denotes a N-order vector at the time t+1, $\Delta H_{0,t}$ is a term for updating a parameter of the first stage adaptive filter in frequency domain, where $\Delta H_{0,t}$ is a N-order vector with N a positive integer.

17. The apparatus according to claim 12, wherein the pre-distortion mapping function employed by the pre-distortion process is expressed as:

$$r_k(t)=f_k(p_k(t)),$$

wherein $r_k(t)$ is the k-th pre-distorted signal, $p_k(t)$ is the k-th pre-processed signal, $f_k(x)\neq cx$, $f_k(x)\neq c$, x denotes $p_k(t)$, $f_k(x)$ denotes the pre-distortion mapping function, c is a constant, and k=1, 2, ..., K.

18. The apparatus according to claim 12, wherein, if an echo path model in the at least one second stage adaptive filter corresponding to the pre-distorted signal is a time domain model $h_{k,t}$, the second error signal is expressed as:

$$e_k(t) = e_0(t) - y_k(t),$$

$$y_k(t) = h_{k,t} \otimes r_k(t) = \sum_{m=1}^{M} h_{k,t}(m) r_k(t-M+m),$$

wherein $h_{k,t}$ is a k-th M-order FIR filter at a time t, k=1, 2, ..., K, $h_{k,t}=[h_{k,t}(1), h_{k,t}(2), \ldots, h_{k,t}(M)]^T$, the superscript T denotes transpose, denotes convolution, t is a time index, M is a number of order, and m denotes an integer index increasing from 1 to M.

19. The apparatus according to claim 18, wherein, if the echo path model is a time domain model $h_{k,t}$, the echo path model $h_{k,t+1}$ of the at least one second stage adaptive filter corresponding to the pre-distorted signal is updated as:

$$h_{k,t+1}=h_{k,t}+\Delta h_{k,t},$$

wherein $h_{k,t+1}$ is a k-th M-order FIR filter at a time t+1, $\Delta h_{k,t}$ is the term for updating the parameter of the at least one second stage adaptive filter in time domain, where $\Delta h_{k,t}$ is a M-order vector with M a positive integer, and k=1, 2, ..., K.

20. The apparatus according to claim 12, wherein, if an echo path model in the at least one second stage adaptive filter corresponding to the K-path pre-distorted signal is a frequency domain model $H_{k,t}$, the second error signal $e_k(t)$ is expressed as:

$$e_k(t)=e_0(t)-),,$$

$$[y_k(t-(N-M)+1), y_k(t-(N-M)+2), \ldots, y_k(t)]^T = [0_{(N-M)\times M} I_{(N-M)\times(N-M)}]F^-[H_{k,t} R_{k,t}],$$

wherein $y_k(t)$ is the K-path second stage filtered signal, t is a time index, a superscript T denotes transpose, N is length of a signal frame, M is a number of order, $0_{(N-M)\times M}$ is a (N−M) by M zero matrix, $I_{(N-M)\times(N-M)}$ is a (N−M) by (N−M) identity matrix, $F^-$ is an inverse discrete Fourier transform matrix, $H_{k,t}$ denotes a k-th N-order vector at the time t, $R_{k,t}F[r_k(t-N+1), r_k(t-N+2), \ldots, r_k(t)]^T$, k=1, 2, ..., K.

21. The apparatus according to claim 20, wherein, if the echo path model is a frequency domain model $H_{k,t}$, the echo path model $H_{k,t+1}$ of the at least one second stage adaptive filter corresponding to the pre-distorted signal is updated as:

$$H_{k,t+1}=H_{k,t}+\Delta H_{k,t},$$

wherein $H_{k,t+1}$ denotes a k-th N-order vector at the time t+1, $\Delta H_{k,t}$ is a term for updating a parameter of the at least one second stage adaptive filter in frequency domain, $\Delta H_{k,t}$ is a N-order vector, and N is a positive integer.

22. The apparatus according to claim 12, wherein the fusion processing unit comprises:

a mapping sub-unit, configured for mapping the first error signal $e_0(t)$ and the second error signal $e_k(t)$ (k=1, 2, ..., K) to corresponding mapping signals respectively using an invertible space mapping method;

a metric computing sub-unit, configured for computing metrics corresponding to the mapping signals using a preset minimum metric function;

a searching sub-unit, configured for searching for a minimum metric from the metrics; and a residue signal obtaining sub-unit, configured for mapping a mapping signal corresponding to the minimum metric back to a space in which the first error signal $e_0(t)$ and the second error signal $e_k(t)$ reside, so as to obtain the residue signal $e(t)$.

* * * * *